US006585848B2

(12) United States Patent
Chadani et al.

(10) Patent No.: US 6,585,848 B2
(45) Date of Patent: Jul. 1, 2003

(54) METHOD FOR ATTACHING ELECTRICALLY CONDUCTIVE SHEET TO DEVELOPER SEALING MEMBER

(75) Inventors: Kazuo Chadani, Shizuoka-ken (JP); Masatoshi Kato, Ushiku (JP); Toshiaki Nagashima, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 09/778,931

(22) Filed: Feb. 8, 2001

(65) Prior Publication Data

US 2001/0030015 A1 Oct. 18, 2001

(30) Foreign Application Priority Data

Feb. 10, 2000 (JP) ....................................... 2000-033508

(51) Int. Cl.[7] .......................... B29C 65/00; G03G 15/08

(52) U.S. Cl. ....................... 156/285; 156/556; 399/106; 399/119

(58) Field of Search ................................ 399/103, 106, 399/111, 119; 156/285, 556, DIG. 2, DIG. 37, 289

(56) References Cited

U.S. PATENT DOCUMENTS 4,859,512 A * 8/1989 Jones et al. ................. 156/230
5,802,431 A 9/1998 Nagashima et al. ........ 399/262
5,814,173 A * 9/1998 Stone ......................... 257/344
6,088,552 A 7/2000 Morinaga et al. ........... 399/106
6,208,817 B1 3/2001 Chadani et al. ............. 399/104

FOREIGN PATENT DOCUMENTS

EP 923004 A2 * 6/1999 .......... G03G/15/08

* cited by examiner

*Primary Examiner*—Jeff H. Aftergut
*Assistant Examiner*—John L. Goff
(74) *Attorney, Agent, or Firm*—Fitzpatrick, Cella, Harper & Scinto

(57) ABSTRACT

A mounting method for mounting an electroconductive sheet on a developer seal member for sealing a developer discharging opening provided in a developer accommodating container for accommodating a developer. The electroconductive sheet is provided with an adhesive material on one surface thereof. A separation sheet is adhered to the one surface, wherein the separation sheet is larger than the electroconductive sheet. The method includes a suction step of contacting a suction tool to the other surface of the electroconductive sheet. The suction tool is effective to suck air to attract the electroconductive sheet thereon. An exposure step separates the separation sheet from the electroconductive sheet, while the electroconductive sheet is being sucked by the attraction tool, so that the one surface of the electroconductive sheet is exposed. A bonding step, after performing the exposure step, binds the one surface of the electroconductive sheet to the developer seal member, while the electroconductive sheet is being sucked by the suction tool.

16 Claims, 19 Drawing Sheets

METHOD FOR ATTACHING ELECTRICALLY CONDUCTIVE SHEET TO DEVELOPER SEALING MEMBER

FIELD OF THE INVENTION AND RELATED ART

The present invention relates to a method for attaching an electrically conductive sheet to a developer sealing member used to seal an opening with which a developer container is provided to release developer. An electrically conductive sheet is used, for example, to detect whether the developer sealing member is open. A developer container is placed in, for example, a developer cartridge or a process cartridge, which is removably mountable in the main assembly of an image forming apparatus.

Here, an image forming apparatus includes an apparatus which forms an image on recording medium with the use of, for example, an electrophotographic image forming system. As examples of an electrophotographic image forming apparatus, there are an electrophotographic copying machine, an electrophotographic printer (for example, laser beam printer, LED printer, and the like), a facsimile apparatus, a word processor, and the like.

A process cartridge means a cartridge in which at least one among a charging means, a developing means, and a cleaning means, and a photosensitive member, are integrally placed, and which is removably mountable in the main assembly of an image forming apparatus.

Conventionally, an image forming apparatus which employs an electrophotographic image formation process also employs a process cartridge system. According to a process cartridge system, an electrophotographic photosensitive member, and a single or plural processing means, which act on an electrophotographic photosensitive member, are integrally placed in a cartridge which is removably mountable in the main assembly of an image forming apparatus. Also according to the process cartridge system, an image forming apparatus can be maintained by users themselves without relying on service personnel, and therefore, operational efficiency can be drastically improved. As a result, a process cartridge system is widely used in the field of the image forming apparatus.

The developer releasing opening of the developer (toner) containing portion of the above described process cartridge is sealed with a toner sealing member. A toner sealing member is removed to release the developer into a developing means containing portion. As for a method for removing a toner sealing member, there are a method in which a toner sealing member is pulled off by a user, and a method in which one end of a toner sealing member is fixed to a winding shaft, and the toner sealing member is automatically wound away by the driving force transmitted from the image forming apparatus main assembly.

The above-described methods for removing a toner sealing member also apply to a developer cartridge.

Thus, a method has been sought for detecting whether the developer releasing opening of a developer containing portion is entirely exposed when a toner sealing member is automatically removed. For this purpose, it has been a common practice that an electrically conductive portion which is severed as the toner sealing member is removed is formed on a toner sealing member, and whether the developer releasing opening is entirely exposed is detected by reading the condition of the electrically conductive portion, on the image forming apparatus main assembly side. However, the electrically conductive portion is an extremely thin sheet of electrically conductive material, such as aluminum foil, coated with adhesive, and therefore, tends to plastically deform when it is separated from a separation sheet, or in the like situations. Therefore, a conventional method for pasting an electrically conductive portion onto a toner sealing member, without deforming the electrically conductive portion, and with a high degree of positional accuracy, requires a substantial number of steps, which in turn results in a high cost.

SUMMARY OF THE INVENTION

The primary object of the present invention is to provide a method for pasting an electrically conductive sheet on a developer sealing member and a developer holding portion, with a high degree of positional accuracy, without plastically deforming the electrically conductive sheet.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Hereinafter, the preferred embodiments of the present invention will be described with reference to the appended drawings.

Embodiment 1

(Description of Process Cartridge and Image Forming Apparatus Main Assembly)

Figure 1:
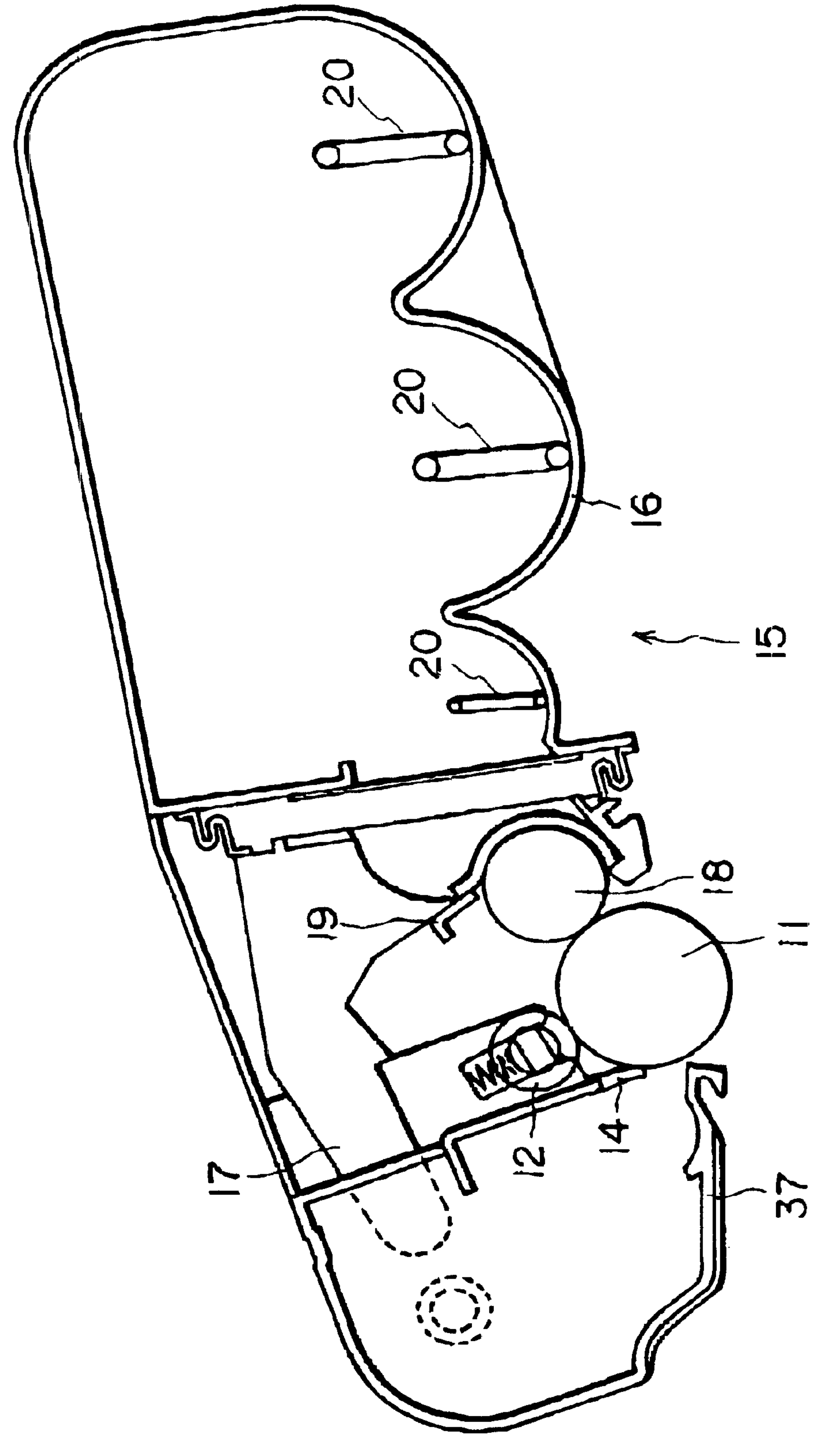
FIG. 1 is a schematic sectional view of the process cartridge in the first embodiment of the present invention, at a plane perpendicular to the longitudinal direction of the process cartridge.
Figure 2:
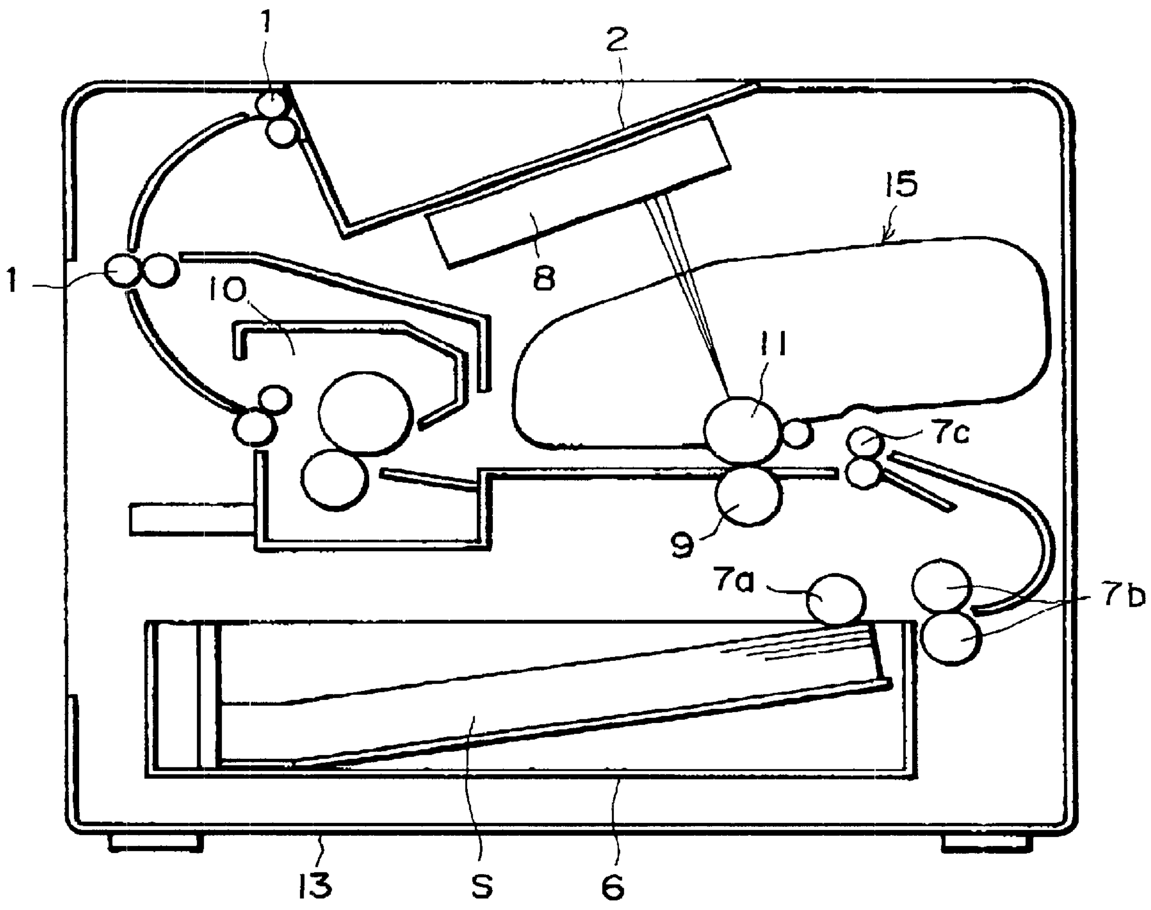
FIG. 2 is a schematic sectional view of the main assembly of the image forming apparatus in the first embodiment of the present invention, at a plane perpendicular to the longitudinal direction of the process cartridge in the apparatus.

Referring to FIGS. 1 and 2, the first embodiment of the present invention will be described. FIG. 1 is a sectional view of the process cartridge in this embodiment, at a plane perpendicular to the longitudinal direction of the process cartridge, and FIG. 2 is a sectional view of the main assembly of the image forming apparatus in this embodiment, at a plane perpendicular to the longitudinal direction of the process cartridge. This process cartridge is provided with an image bearing member, and a single or plurality of processing means which act on the image bearing member. As for the processing means, there are, for example, a charging means for charging the peripheral surface of the image bearing member, a developing means for forming a toner image on the image bearing member, and a cleaning means for removing the toner remaining on the peripheral surface of the image bearing member. A requirement for a cartridge to be a process cartridge, is to be provided with an image bearing member, and a minimum of one processing means.

This embodiment relates to a process cartridge which comprises at least a developing means. Referring to FIG. 1, the process cartridge 15 in this embodiment comprises: an electrophotographic photosensitive drum 11 (hereinafter, "photosensitive drum"); a charge roller 12 as a charging means; a development roller 18 as a developing means; a development blade 19; a toner holding frame portion 16 as a developer container in which toner as developer is held; a stirring member 20, that is, a rotational member, for stirring the toner within the toner holding frame portion 16; a cleaning blade 14 as a cleaning means; and a cleaning means holding portion 37; and a housing in which the preceding components are integrally placed, and which is removably mountable in the main assembly of an image forming apparatus main assembly 13. The charge roller 12, development roller 18, development blade 19, and cleaning blade 14 are positioned in a manner to surround the peripheral surface of the photosensitive drum 11.

This process cartridge 15 is mounted in the image forming apparatus main assembly 13 illustrated in FIG. 2, to be used for image formation. An image forming operation is carried out in the following manner. First, a sheet S of recording medium is fed out of a sheet cassette 6 mounted in the bottom portion of the image forming apparatus main assembly 13, into the image forming apparatus main assembly 13, by a sheet feeding roller 7*a,* and then is conveyed to a transfer station by a conveying roller pair 7*b* having a retarding function, and a registration roller pair 7*c*. In the transfer station, the toner image on the photosensitive drum 11 is transferred onto the recording medium sheet S. As for the photosensitive drum 11, after being charged by the charge roller 12, the peripheral surface of the photosensitive drum 11 is selectively exposed by an exposing apparatus 8, in accordance with image formation information. As a result, an electrostatic latent image is formed on the peripheral surface of the photosensitive drum 11. The exposing process by the exposing apparatus 8 is carried out in synchronism with the sheet conveyance by the registration roller pair 7*c*. Meanwhile, the toner within the toner holding frame portion 16 is sent into the developing means holding frame portion 17, in which the toner is coated in a thin layer onto the peripheral surface of the development roller 18 by the development blade 19, and then, the toner on the development roller 18 is supplied to the peripheral surface of the photosensitive drum 11, in accordance with the latent image on the photosensitive drum 11, by applying development bias to the development roller 18. As a result, a toner image is formed on the peripheral surface of the photosensitive drum 11. Then, this toner image is transferred onto the recording medium sheet S by the bias voltage applied to a transfer roller 9, in the transfer station. Then, the recording medium sheet S is conveyed to a fixing apparatus 10, in which the toner image on the recording medium sheet S is fixed to the recording medium sheet S. Finally, the recording medium sheet S is discharged into a delivery portion 2 on top of the apparatus main assembly, by discharge roller pairs 1.

(Description of Opening of Toner Seal and Stirring Drive)

Figure 3:
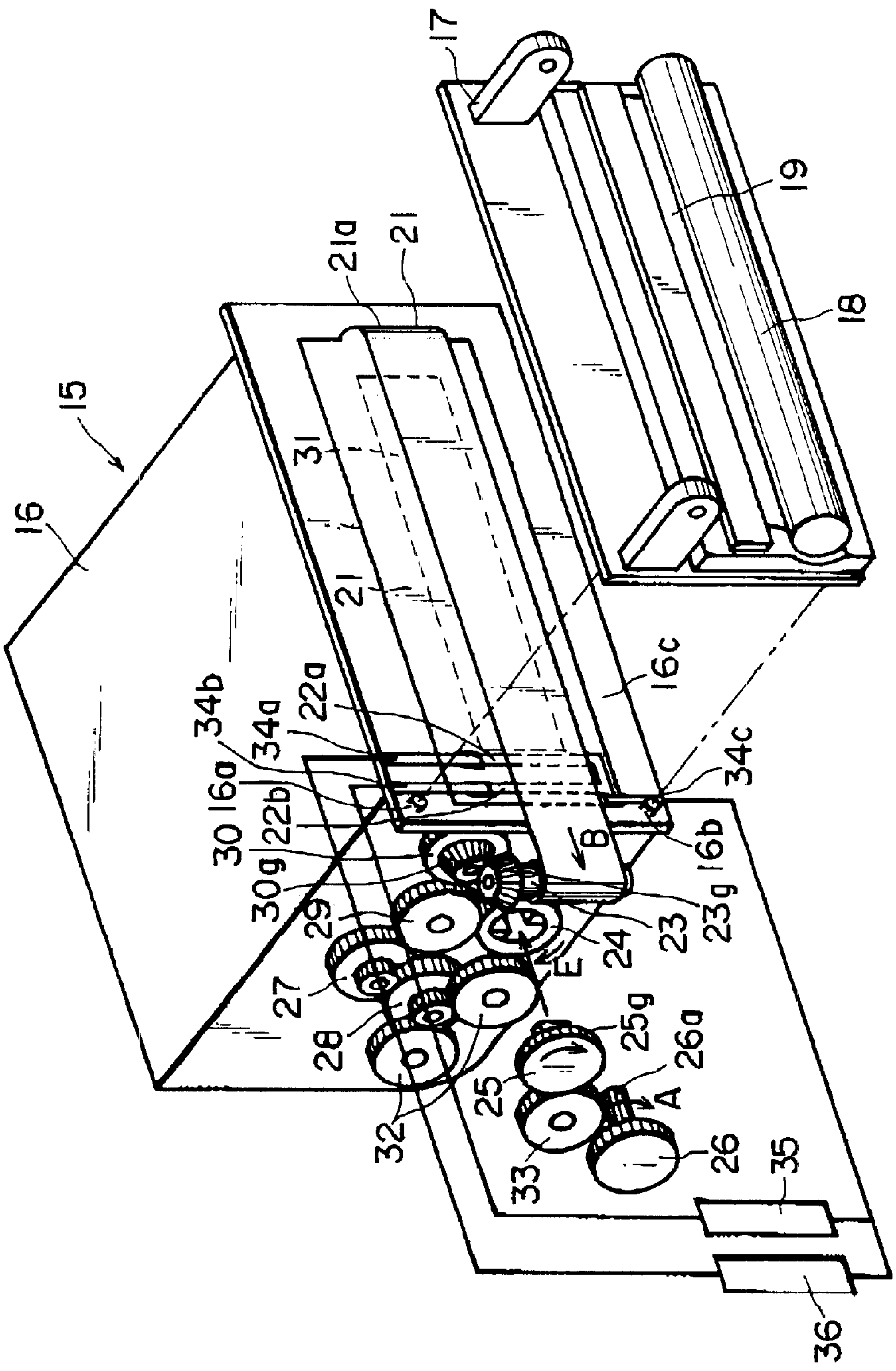
FIG. 3 is a schematic perspective view of the toner holding portion of the process cartridge, in a brand-new condition, in the first embodiment of the present invention.
Figure 4:
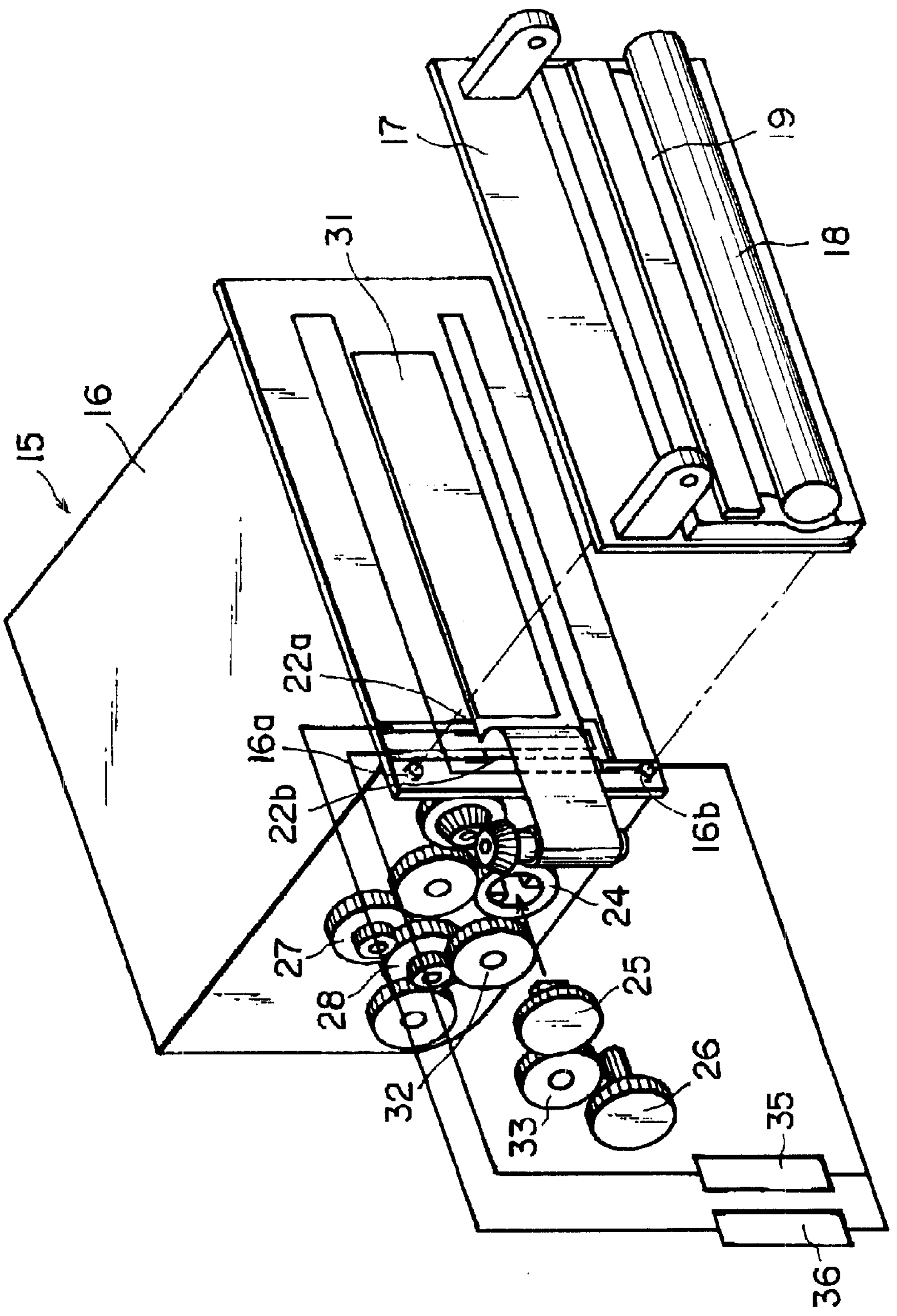
FIG. 4 is a schematic perspective view of the toner holding portion of the process cartridge in the first embodiment of the present invention, after the toner sealing member was wound away.
Figure 5:
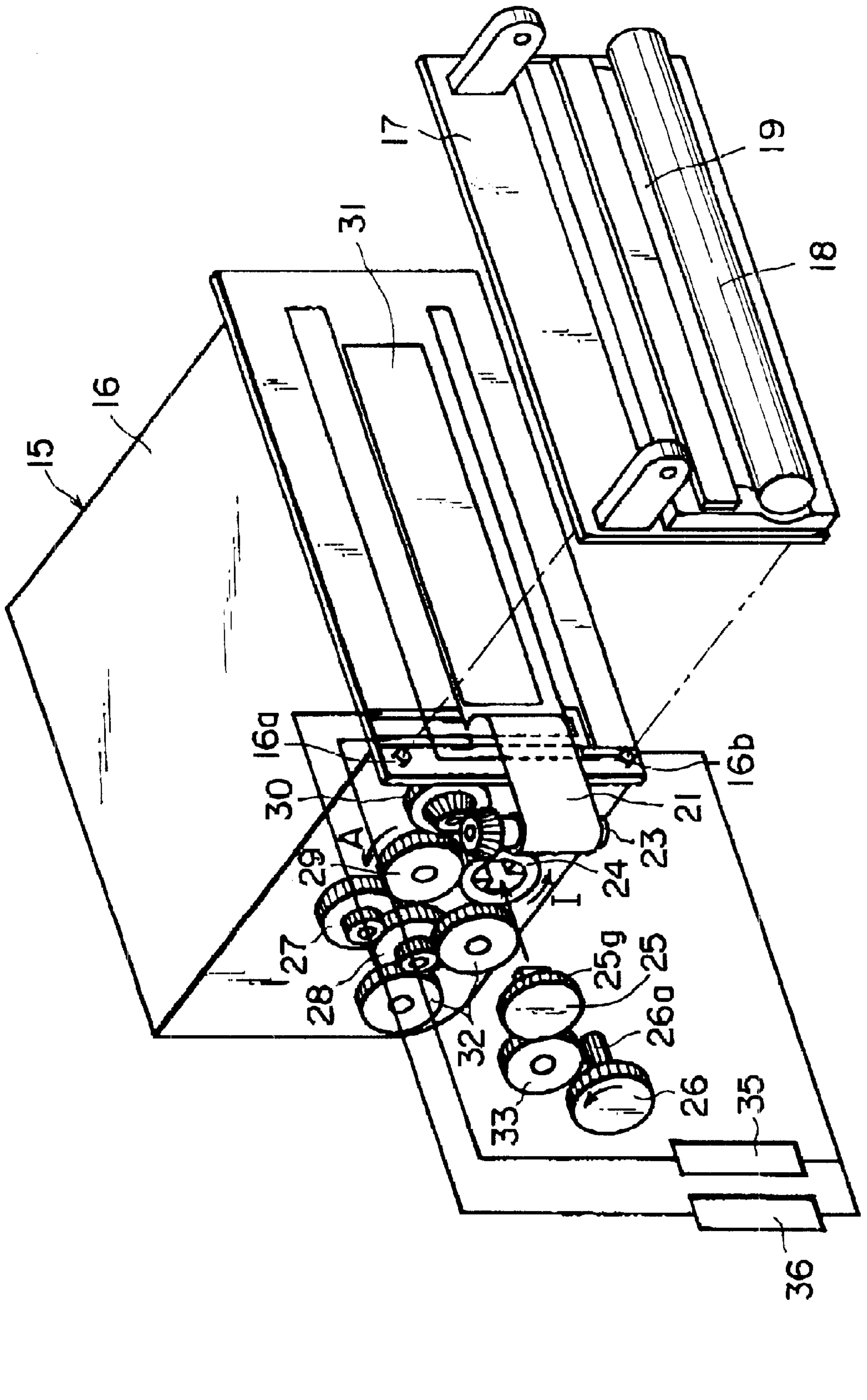
FIG. 5 is a schematic perspective view of the toner holding portion of the process cartridge in the first embodiment of the present invention, while the stirring member is rotated.
Figure 6:
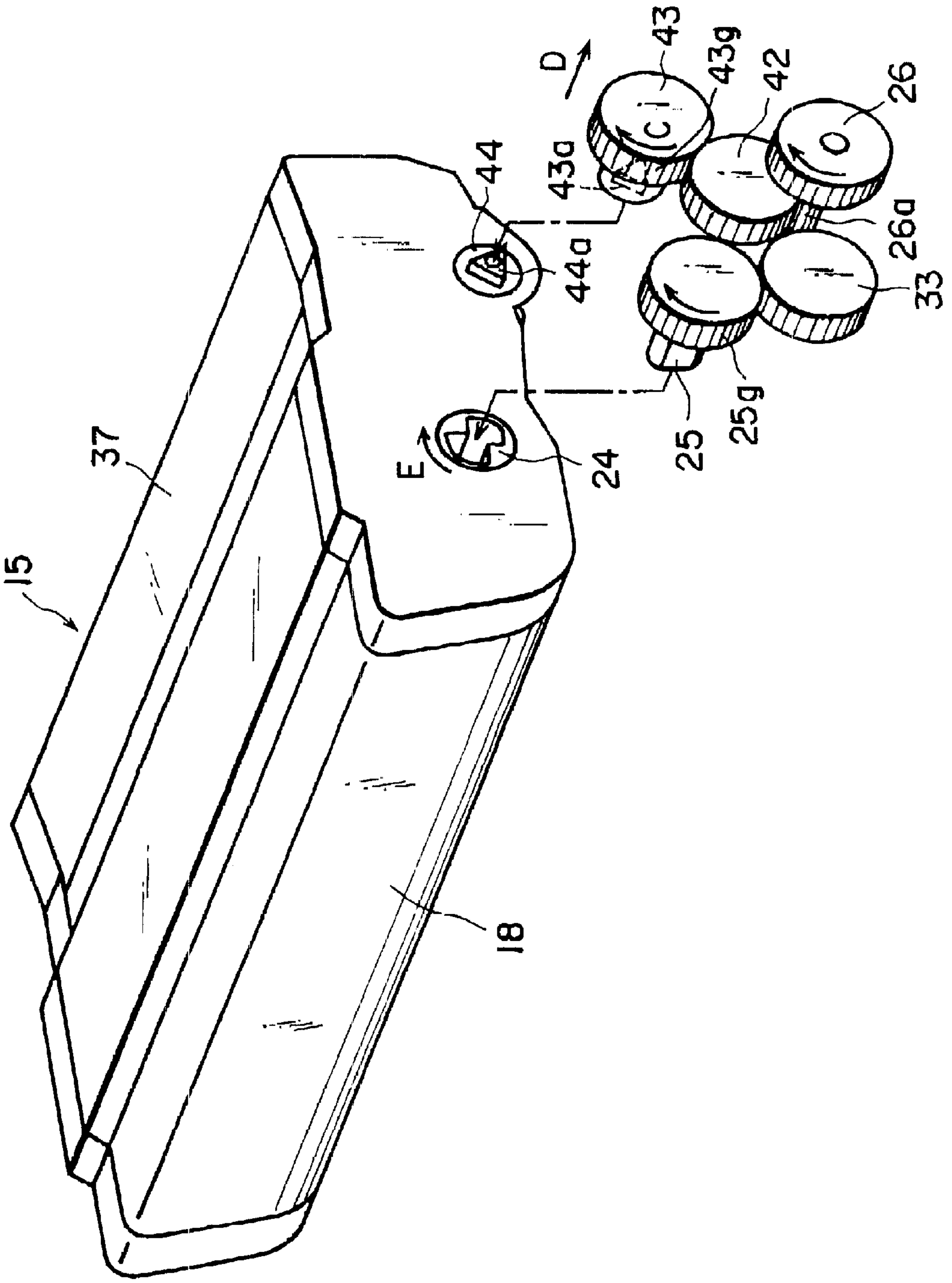
FIG. 6 is a schematic perspective view of the toner holding portion of the process cartridge in the first embodiment of the present invention, while the toner sealing member is wound away.
Figure 7:
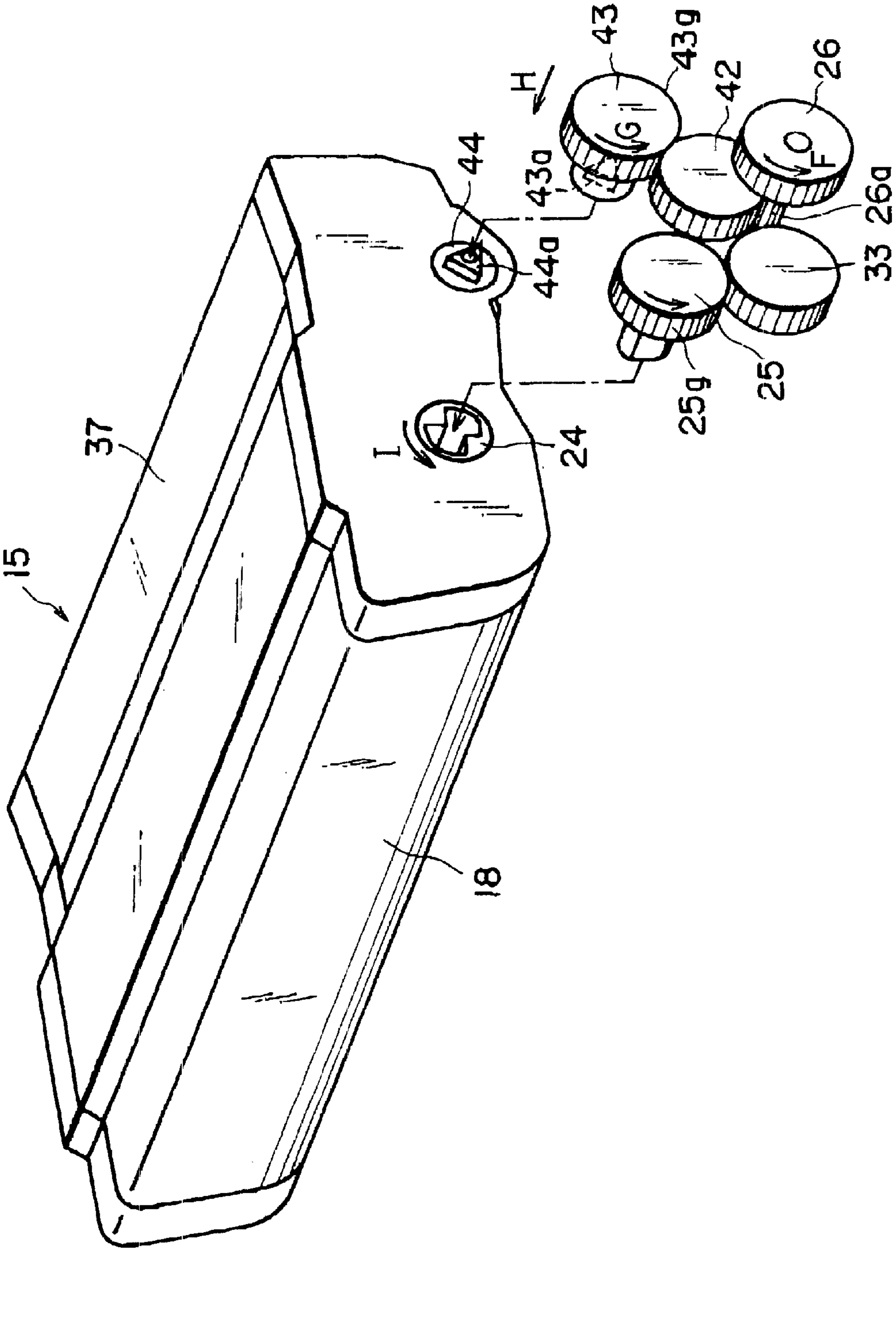
FIG. 7 is a schematic perspective view of the toner holding portion of the process cartridge in the first embodiment of the present invention, while the photosensitive drum and stirring member are rotated.

FIGS. 3 through 5 show the toner holding frame portion 16 of the process cartridge in this embodiment. FIGS. 6 and 7 show the gear trains in the process cartridge 15 and image forming apparatus main assembly 13. FIG. 3 shows the process cartridge 15 in the brand-new state. In this state, the opening 31 of the toner holding frame portion 16 of the process cartridge 15 is covered with a toner sealing member 21, which is welded or pasted to the seal attachment surface 16*c*, that is, the surrounding edge portion of the opening 31, of the toner holding frame portion 16. More specifically, the toner sealing member 21 is placed across the opening 31 from one longitudinal end of the opening to the other, and then is folded upon the portion attached to the surrounding edge portion of the opening 31, all the way back to the starting point being fixed to a winding member 23 rotationally attached to the toner holding frame portion 16. For the sake of convenience in describing this embodiment, FIG. 3 shows the states of the developing means holding frame portion 17, toner holding frame portion 1, and their adjacencies, before they are joined. In reality, however, the developing means holding frame portion 17 and toner holding frame portion 16 are attached to each other, with the interposition of another frame portion, and with the dowel-like positioning projections 16*a* and 16*b* of the toner holding frame portion 16 fitted in the unillustrated positioning holes of the developing means holding frame portion 17.

The toner sealing member 21 is provided with an electrically conductive portion 22*a* (hereinafter, "conductive portion 22*a*") for detecting whether the opening 31 is fully exposed, and an electrically conductive portion 22*b* (hereinafter, "conductive portion 22*b*") for detecting whether the process cartridge 15 is properly positioned in the image forming apparatus main assembly 13. In this embodiment, the dimensions of the conductive portions 22*a* and 22*b* corresponding to the width direction of the opening 31, that is, the direction perpendicular to the removing direction of the toner sealing member 21, are made greater than the width W of the portion of the toner sealing member 21, which is to be torn away. The conductive portions 22*a* and 22*b* are placed on the toner sealing member 21 to be opened, perpendicular to the longitudinal direction of the opening 31, across the opening 31. They are formed of aluminum foil (30 μm thick) and are coated with adhesive (50 μm thick). To these conductive portions 22*a* and 22*b*, voltage is applied by detecting portions 35 and 36 of the image forming apparatus main assembly 13, through a metallic plate with contacts 34*a*, 34*b*, and 34*c*, of the process cartridge 15.

As the process cartridge 15 in the brand-new state is mounted into the image forming apparatus main assembly 13, the detecting portion 35 becomes electrically connected to the contacts 34*b* and 34*c* which are electrically connected to each other by the conductive portion 22*b*, whereas the detecting portion 36 becomes electrically connected to the contacts 34*a* and 34*c* which are connected to each other by the conductive portion 22*a*. Prior to the winding away of the toner sealing member 21, the conductive portions 22*a* and 22*b* are intact in terms of electrical conductivity. These states of the conductive portions 22*a* and 22*b* are detected by the detecting portions 35 and 36 of the image forming apparatus main assembly 13. After the mounting of the process cartridge 15 into the image forming apparatus main assembly 13, a motor 26 as a driving force source provided on the image forming apparatus main assembly 13 side begins to rotate in the direction of an arrow mark A (FIGS. 3 and 6).

Referring to FIG. 6, as the motor 26 rotates in the direction of the arrow mark A, a first coupling 43 on the image forming apparatus main assembly 13 side moves in the direction of an arrow mark D while being rotated in the direction of an arrow mark C by the motor 26 through an idler gear 42, so that the first coupling 43 rotates without engaging with a first coupling 44 attached to one of the longitudinal ends of the photosensitive drum 11 in the process cartridge 15. A pinion gear 26*a* fitted around the shaft of the motor 26 is meshed with the idler gear 42, which is meshed with a gear 43*g* which is the peripheral portion of the first coupling 43. A second coupling gear 24 on the process cartridge 15 side is engaged with a second coupling 25, and is rotated in the direction indicated by an arrow mark E as the driving force from the motor 26 on the image forming apparatus main assembly 13 side is transmitted through the pinion gear 26*a*, an idler gear 33, and the gear 25*g* of the second coupling 25 on the image forming apparatus main assembly 13 side, as shown in FIG. 3.

The second coupling gear 24 transmits the driving force to a pivotal gear 29, by meshing with the pivotal gear 29 with which the process cartridge 15 is provided. The pivotal gear 29 is rotationally supported by the end portion of an unillustrated arm attached to the process cartridge 15 in such a manner that the pivotal axis of the pivotal gear 29 coincides with the rotational axial of the second coupling gear 24. Thus, the pivotal gear 29 pivots in the clockwise direction, remaining engaged with the second coupling gear 24, due to the presence of the load applied to the teeth of the pivotal gear 29 by the teeth of the second coupling gear 24 as the second coupling gear 24 rotates in the direction of an arrow mark E. As the pivotal gear 29 is pivoted in the clockwise direction, it meshes with an idler gear 30, transmitting the driving force to the idler gear 30. As a result, a bevel gear 23*g*, which is an integral part of a winding member 23, and is meshed with a bevel gear portion 30*g* of the idler gear 30, rotates, causing the toner sealing member 21 to be wound away in the direction of an arrow mark B by the winding member 23. During this period, the pivotal gear 29 remains separated from an idler gear 27, it remains disengaged from the idler gear 27.

Referring to FIG. 4, toward the end of the process in which the opening 31 is entirely exposed, the conductive portion 22*a* is severed, and therefore, the electrical conduction between the contacts 34*a* and 34*c* is interrupted. As this interruption of the electrical conduction caused by the severing of the conductive portion 22*a* is detected by the detecting portion 36 of the image forming apparatus main assembly 13, the motor 26, the driving force of which has been transmitted to the winding member 23, begins to rotate in reverse, that is, in the direction indicated by an arrow mark F, as shown in FIGS. 5 and 7. As the motor 26 rotates in reverse in the direction of the arrow mark F as shown in FIGS. 5 and 7, the driving force is transmitted to the first coupling 43 on the image forming apparatus main assembly 13 side through the pinion gear 26*a,* idler gear 42, and gear 43*g,* and moves the first coupling 43 in the direction of an arrow mark H, while rotating it in the direction of an arrow mark G. As a result, the first coupling gear 43 engages with the first coupling 44 attached to one of the longitudinal ends of the photosensitive drum 11 in the process cartridge 15, and rotates with the first coupling 44, transmitting the driving force to the photosensitive drum 11. In this embodiment, the gears 42 and 43*g* are given helical teeth to move the first coupling 43 on the image forming apparatus main assembly 13 side in the direction indicated by either the arrow mark D or H. However, another mechanical arrangement may be employed to move the first coupling 43 on the main assembly side. Meanwhile, the second coupling gear 24 on the process cartridge 15 side rotates in reverse, that is, in the direction of an arrow mark I. As a result, the pivotal gear 29 is disengaged from the idler gear 30 by the load received by the teeth of the pivotal gear 29 from the second coupling gear 24, and meshes with the idler gear 27, rotating the idler gear 27. Consequently, the driving force is transmitted to a pair of stirring gears 32 which rotate the stirring members 20 within the toner holding frame portion 16 illustrated in FIG. 1, through an idler gear 28 meshed with the idler gear 27. The idler gears 27 and 28 are step gears.

(Description of Toner Sealing Member)

Figure 8:
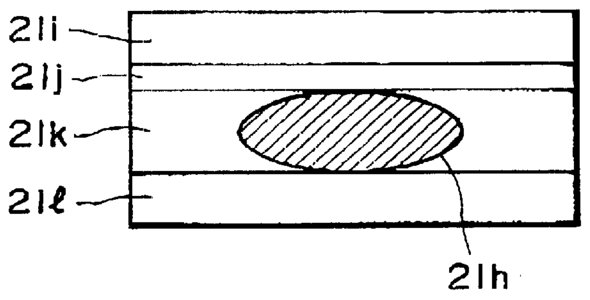
FIG. 8 is a sectional view of the toner sealing member in the first embodiment of the present invention.
Figure 9:
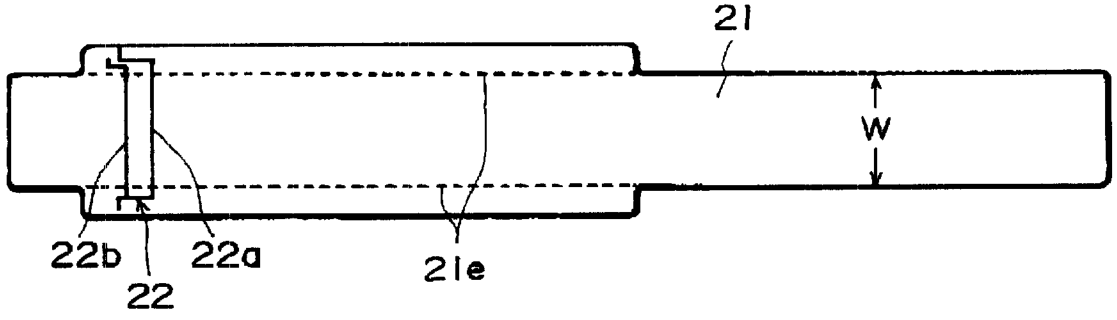
FIG. 9 is a plan view of the toner sealing member in the first embodiment of the present invention.

The toner sealing member 21 used in this embodiment is shown in FIGS. 8 and 9. This toner sealing member 21 has a laminar structure. That is, listing from the top side, the toner sealing member 21 comprises: a surface layer, or a 12 μm thick polyester layer (strength providing layer; designated by a reference character 21*i* in FIG. 8); a 7 μm thick aluminum foil layer (laser light shielding layer; designated by a reference character 21*j* in FIG. 8); a 50 μm thick polyester layer (tear line providing layer; designated by a reference character 21*k* in FIG. 8); and a 50 μm thick sealant layer (adherent layer; designated by a reference character 211 in FIG. 8).

Tear lines 21*e* (FIG. 9), along which the toner sealing member 21 is torn away to expose the opening 31, are formed by a laser. More specifically, a laser beam is projected upon the toner sealing member 21 from the sealant layer 211 side to melt predetermined portions of polyester layer, as the tear line providing layer 21*k,* and the sealant layer 211, so that numerous perforations 21*h* (FIG. 8) are created. FIG. 8 is a sectional view of the toner sealing member 21, and shows one of the perforations 21*h* created by a laser. The aluminum foil layer 21*j* shields the top layer, or the polyester layer 21*i,* from the laser beam, and therefore, the polyester layer 21*i* is not damaged by the laser beam, remaining fully capable of keeping the toner sealed in the toner holding frame portion 16. When exposing the opening 31, as the toner sealing member 21 is pulled, the stress caused by the pulling concentrates to the perforations 21*h* created by the laser, assuring that the toner sealing member 21 is torn along the tear lines 21*e* to expose the opening 31.

The conductive member 22 in this embodiment is a patterned piece of aluminum foil pasted on the toner sealing member 21. One aspect of the conductive member 22 is electrical resistance. The value of the electrical resistance of the conductive member 22 to which voltage is applied to test the conductivity of the conductive member 22 may be as large as it can be, as long as the amplitude of the voltage applied to test the conductivity of the conductive member 22 can be increased accordingly. In reality, however, applying high voltage for testing the conductivity is difficult from the standpoints of safety as well as cost. Thus, the electrical resistance value of the conductive member 22 is desired to be as small as possible so that the conductivity can be tested even if the low voltage is applied. More specifically, it is desired to be no more than 100 Ω, possibly, no more than 10 Ω. The electrical resistance value of the conductive member 22 in this embodiment is approximately 1 Ω; in other words, the conductivity of the conductive member 22 is excellent prior to its severance. After the severance, the electrical resistance of the conductive member 22 is infinite, preventing electrical current from flowing through the once conductive member 22.

In other words, as for the material for the conductive member, any material will suffice as long as it satisfies the requirement that the electrical resistance value of the conductive member must be low enough to afford the conductive member a sufficient degree of electrical conductivity, prior to its severance. For example, foil of copper, nickel, or the like metals, can be used as the material for the conductive member. Further, the conductive member 22 must be severed along the tear lines 21*e* of the developer sealing member. Thus, if it is not assured that the conductive member 22 can be severed with the application of a small amount of force, it is possible that the force which must be applied to open the conductive member 22 will be excessively large, or the entirety of the conductive member 22 formed of metallic foil, will be peeled away, adhering to, or falling onto, the other parts of the apparatus. As for a method for reducing the tear resistance of the conductive member 22, it is effective to reduce the thickness of the metallic foil. However, the reduction in the metallic foil thickness tends to cause the conductive member 22 formed of metallic foil to deform, when the conductive member 22 is separated from a separation sheet 53, or when the conductive member 22 is pasted to the toner sealing member 21.

(Method for Pasting Adhesive Coated Conductive Member)

Figure 10:
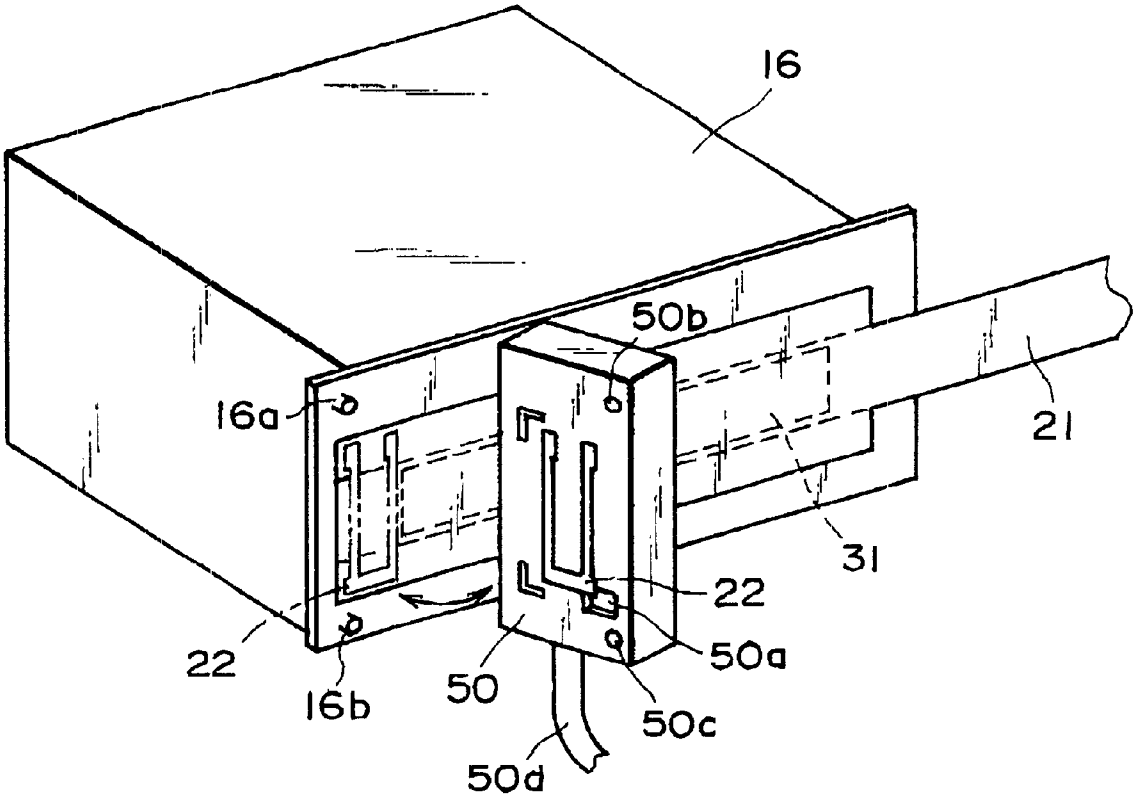
FIG. 10 is a schematic perspective view of the toner holding portion of the process cartridge in the first embodiment of the present invention, during the process in which an electrically conductive member formed of metallic foil is pasted to the toner holding portion.

Referring to FIGS. 10 through 14, a method for pasting an adhesive coated metallic foil will be described. Here, it is assumed that the opening 31 of the toner holding frame portion 16 has been already sealed with the toner sealing member 21. First, the conductive member 22, the separation paper 53, and a suction based holding jig 50, are prepared. One surface of the conductive member 22 has been coated with adhesive, and this adhesive coated surface of the conductive paper 53 placed in contact with the adhesive layer. The separation paper 53 is greater in size than the conductive member 22, extending beyond the edge of the conductive member 22, and is square. Referring to FIG. 10, the toner releasing opening 31 of the toner holding frame portion 16 is entirely sealed with the toner sealing member 21 which has been heat-welded to the surrounding edge of the opening 31. Further, the toner holding frame portion 16 is provided with the dowel-like projections 16*a* and 16*b* for positioning the toner holding portion 16 relative to the developing means holding frame portion 17.

Figure 11:
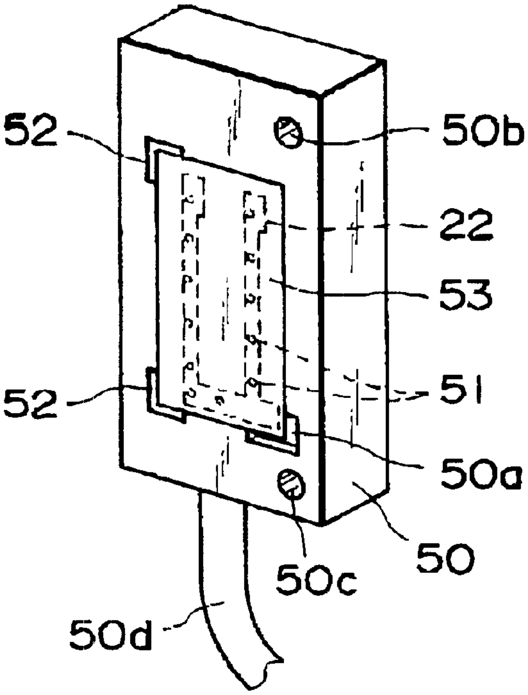
FIG. 11 is a schematic perspective view of the separation sheet backed electrically conductive member formed of metallic foil, which is being held to the suction based holding jig by suction, in the first embodiment of the present invention
Figure 12:
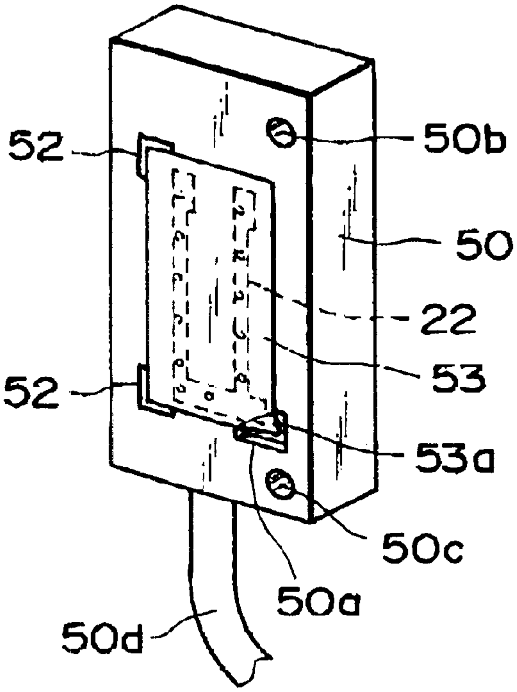
FIG. 12 is a schematic perspective view of the separation sheet backed electrically conductive member formed of metallic foil, a portion of which has been bent inward of the recess of the suction based holding jig, in the first embodiment of the present invention.
Figure 13:
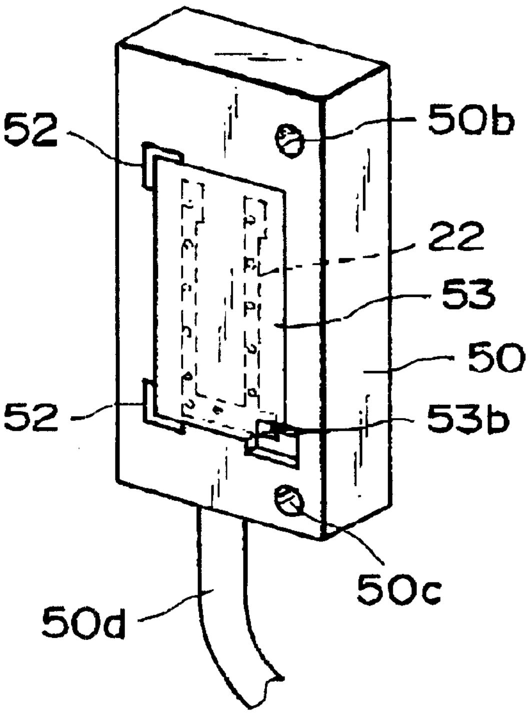
FIG. 13 is a schematic perspective view of the separation sheet backed electrically conductive member formed of metallic foil, a portion of the separation sheet portion of which has been separated from the electrically conductive member, and has become a separation tab for peeling the separation sheet from the electrically conductive member, in the first embodiment of the present invention.
Figure 14:
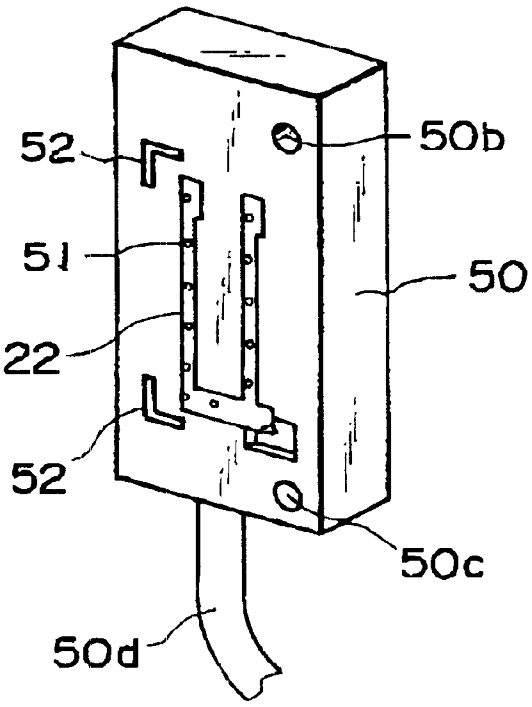
FIG. 14 is a schematic perspective view of the electrically conductive member formed of metallic foil, which is being held to the suction based holding jig, in the first embodiment of the present invention.

A method for forming the conductive member 22 on the toner sealing member 21 will be described. Referring to FIG. 11, the suction based holding jig 50 is provided with a plurality of suction holes 51. The conductive member 22 formed of metallic foil, coated with a layer of adhesive and backed by the separation paper as a separation sheet, is held by suction to the positioning portion 52 of the suction based holding jig 50, with the separation paper 53 being on the outward side, so that the separation paper can be peeled away while leaving the conductive member 22 held to the suction based holding jig 50. The suction holes 51 are connected to a hose 50*d* (FIGS. 11–14) connected to a suction generating apparatus (unillustrated). The area of the suction based holding jig 50, to which the aforementioned extending portion of the separation paper 53 is held, is provided with a recess 50*a,* which is located so that it partially overlaps with the conductive member 22 formed of metallic foil when the metallic foil is being held to the suction based holding jig 50. With the conductive member 22 formed of metallic foil, coated with adhesive and backed by the separation paper 53, being held to the suction based holding jig 50; if the separation paper backed corner portion 53*a* of the metallic foil, which extends over the recess 50*a* as shown in FIG. 11, is bent inward of the recess 50*a* as shown in FIG. 12, the corner portion 53*a* of the conductive member 22 formed of metallic foil remains bent inward of the recess 50*a,* whereas the portion of the separation paper 53 corresponding to the portion 53*a* straightens back, separating itself from the corner portion 53*a,* becoming a separation tab 53*b* (FIG. 13), because the separation paper 53 is harder to deform compared to the conductive member 22 formed of metallic foil. With the employment of this method, the separation paper 53 can be safely separated from the adhesive coated surface of the conductive member 22 formed of metallic foil, without deforming the conductive member 22 formed of metallic foil, except for the portion corresponding to the above-described separation tab 53*b*. Next, the separation paper 53 is separated (FIG. 14). Then, the suction based holding jig 50 is placed on the toner holding frame portion 16, with the metallic foil holding surface facing the toner holding frame portion 16, and also with the dowel-like positioning projections 16*a* and 16*b,* which are provided on the toner holding frame portion 16 in order to paste the conductive member 22 formed of metallic foil, held to the surface of the suction based holding jig 50, to the toner sealing member 21, being aligned with the corresponding positioning holes 50*b* and 50*c* of the suction based holding jig 50. Then, the suction to the suction based holding jig 50 is stopped. As a result, the conductive member 22 formed of metallic foil is accurately positioned to be pasted to the toner sealing member 21, across the predetermined area (FIG. 10). Thereafter, the conductive member 22 formed of metallic foil is pressed again onto the toner sealing member 21. With the employment of the above described method, the conductive member 22 can be perfectly pasted to the toner sealing member 21, from one longitudinal edge of the toner releasing opening 31 to the other, from one longitudinal edge of the toner sealing member 21 to the other, or even from one longitudinal edge of the toner holding frame portion 16 to the other, across the opening 31 in terms of its width direction.

(Description of Driving Force Transmitting Method and Coupling Members)

Figure 15:
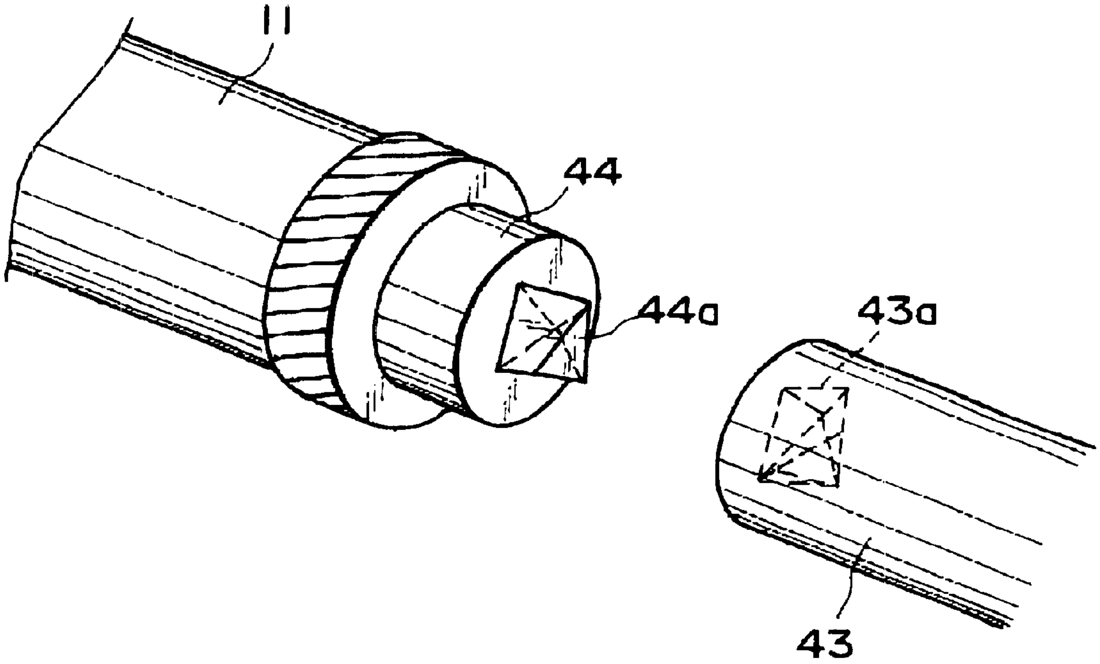
FIG. 15 is a schematic perspective view of the first coupling of the process cartridge, and the first coupling of the image forming apparatus main assembly, in the first embodiment of the present invention.

Next, referring to FIGS. 15 through 17, the shapes of the couplings will be described. Referring to FIG. 15, the first coupling 44 on the process cartridge side has a projection 44*a*, which has a sectional profile of an approximately equilateral triangle; more precisely, the projection 44*a* is in the form of a triangular pillar twisted about its rotational axis in its rotational direction. The first coupling 43 on the apparatus main assembly side, which engages with the first coupling 44, has a hole 43*a*, which is in the form of a triangular pillar twisted about its rotational axis in its rotational direction, and into which the projection 44*a* engages. With the provision of this structural arrangement between the two couplings 44 and 43, as the first coupling 43 on the main assembly side is rotated, with the first coupling 44 on the process cartridge side engaged in the hole 43*a*, the lateral edges of the projection 44*a* come into contact with the corresponding lateral walls of the hole 34*a*, and cause the first coupling 44 on the process cartridge side to rotate in a manner to equalize the three interfaces between the corresponding lateral edges of the projection 44*a* and the lateral walls of the hole 43*a* in terms of the contact pressure. As a result, driving force is transmitted from the first coupling 43 on the apparatus main assembly side to the first coupling on the process cartridge side while the rotational axis of the two couplings 44 and 43 are maintained in alignment with each other.

Figure 16:
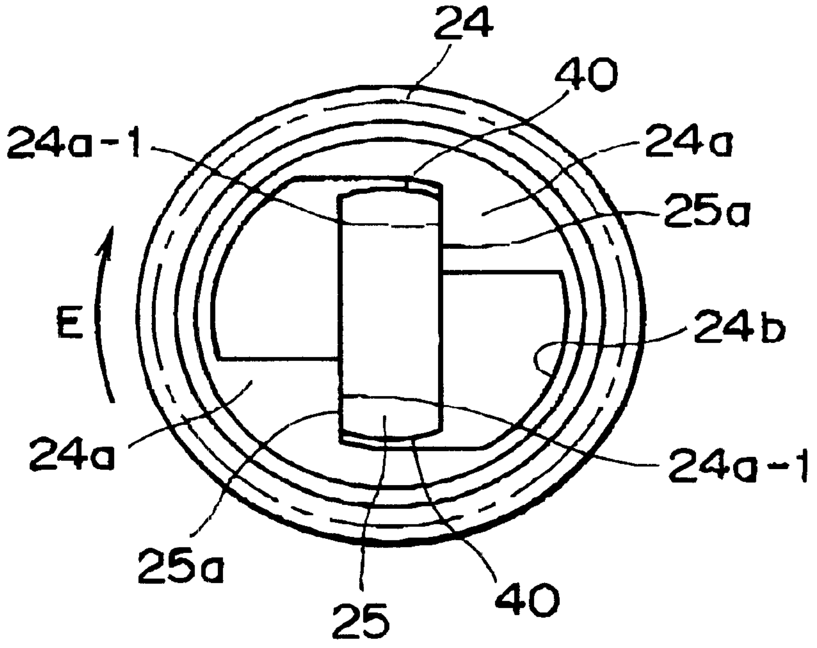
FIG. 16 is a plan view of the second coupling of the process cartridge, and the second coupling of the image forming apparatus main assembly, in the first embodiment of the present invention, while they are rotating in the direction to remove the toner seal.
Figure 17:
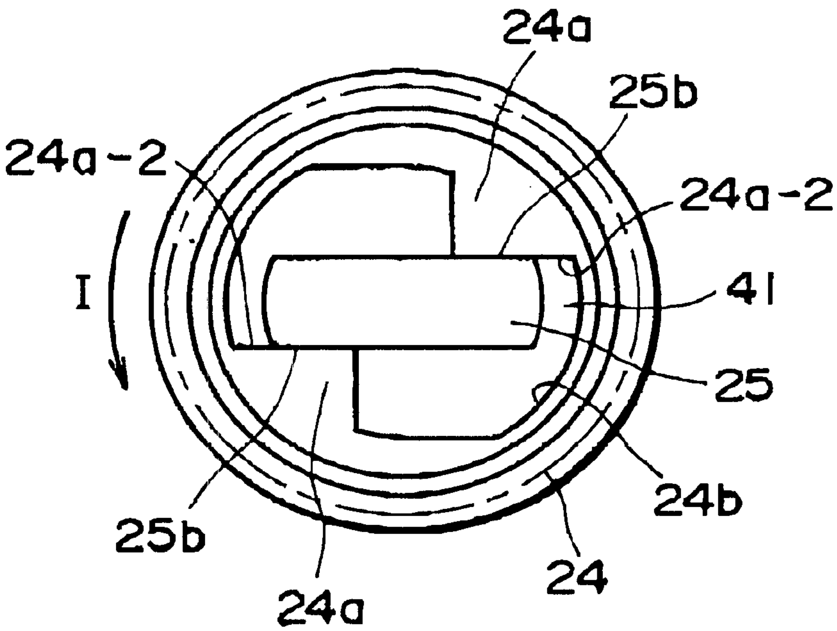
FIG. 17 is a plan view of the second coupling of the process cartridge, and the second coupling of the image forming apparatus main assembly, in the first embodiment of the present invention, while they are rotating in the direction to drive the stirring member.

Referring to FIGS. 16 and 17, the second coupling 25 on the apparatus main assembly side has a projection in the form of a flatted round pillar, whereas the second coupling within the process cartridge 15 has a hole 24*b,* the side wall of which constitutes the second coupling gear 24, which is a combination of the cylindrical, lateral wall of the hole 24*b,* and a pair of ribs 24*a* in the form of a pillar having a sectional profile of a right-angled triangle, attached to the cylindrical, lateral wall of the hole 24*b* in symmetrical manner with respect to the center axis of the hole 24*b*. Looking squarely at FIGS. 16 and 17, each rib 24*a* has a sectional profile in the form of a triangle, one of the apexes of which points to the axial line of the gear 24; in other words, the ribs 24*a* are symmetrically positioned with respect to the axial line of the gear 24, and the surfaces of one of the ribs 24*a,* and the surfaces of the other rib 24*a,* which are symmetrically positioned with respect to the axial line of the gear 24, are parallel to each other.

Referring to FIG. 16, as the second coupling 25 on the apparatus main assembly side rotates in the direction to remove the toner sealing member 21, that is, in the direction of the arrow mark E, the surface 24*a*-1 of each of the ribs 24*a*, which is comparable to one of the two sides of a right-angle triangle, or the shape of the profile of the rib 24*a*, comes into contact with the corresponding contact portion 25*a* of the coupling 25, and transmits driving force. The cylindrical portion of the hole 24*b*, the lateral wall portions of which constitute portions of the second coupling gear 24, is not perfectly circular in cross sectional profile; the distance from the portions of the lateral wall of the hole 24*b* immediately adjacent to the ribs 24*a* to the rotational axis of the coupling gear 24 is rendered smaller than the distance between the rest of the lateral wall of the hole 24*b* to the rotational axis of the coupling gear 24, in order to reduce the gap 40 between the coupling 25 on the apparatus main assembly side and the coupling gear 24 in terms of the diameter direction of the two couplings.

In this embodiment, the gap 40 between the second coupling gear 24, and the second coupling 25 on the main assembly side, in terms of their diameter direction, is approximately 0.5 mm.

As the drive for removing the toner sealing member 21 ends, the second coupling 25 on the apparatus main assembly side is rotated in reverse, that is, in the direction of the arrow mark I. As a result, the contact portions 25*b* of the second coupling 25 on the apparatus main assembly side come into contact with the corresponding surfaces 24*a*-2 of the ribs 24*a,* which are comparable to the other sides of the right-angle triangle, or the shape of the profile of the rib 24*a,* and drive the second coupling gear 24, transmitting driving force to the stirring members. The second coupling 25 on the main assembly side and the second coupling gear 24 on the process cartridge side are structured so that during this reversal rotation of the second coupling 25 on the main assembly side, the second coupling 25 on the main assembly side and the second coupling gear 24 on the process cartridge side, hold a gap 41 in terms of their radius direction. Therefore, rotational driving force can be transmitted from the second coupling 25 on the apparatus main assembly side to the second coupling gear 24 on the process cartridge side while allowing their rotational axes to remain unaligned with each other.

In this embodiment, the gap 41 is approximately 2 mm.

With the employment of this structural arrangement, when the toner sealing member 21 is removed, the rotational axes of the second coupling 25 on the apparatus main assembly side and the second coupling gear 24 on the process cartridge side are aligned with each other, and the photosensitive drum 11 is not driven. Then, after the completion of the removal of the toner sealing member 21, in other words, during an actual image forming process, the rotational axis of the first coupling 44 of the photosensitive drum 11 and the rotational axis of the first coupling 43 on the apparatus main assembly side are aligned with each other, whereas the second coupling gear 24 on the process cartridge side, and the second coupling 25 on the apparatus main assembly side, for transmitting driving force to the stirring members 20, simply transmit driving force so that they do not interfere with the alignment between the rotational axes of the first coupling 43 and its counterpart.

Figure 18:
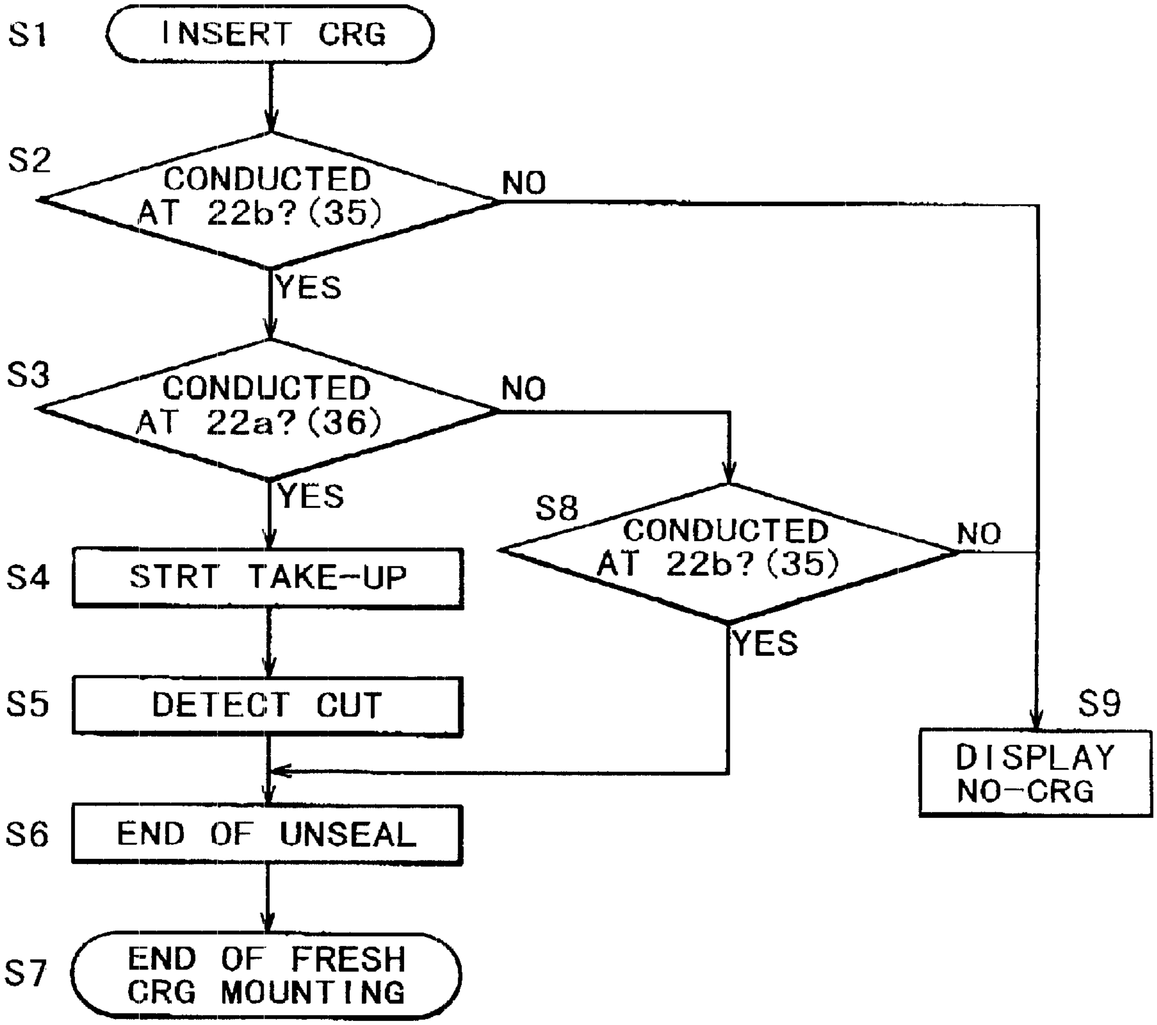
FIG. 18 is a flowchart of the toner seal removing operation in the first embodiment.
Figure 19:
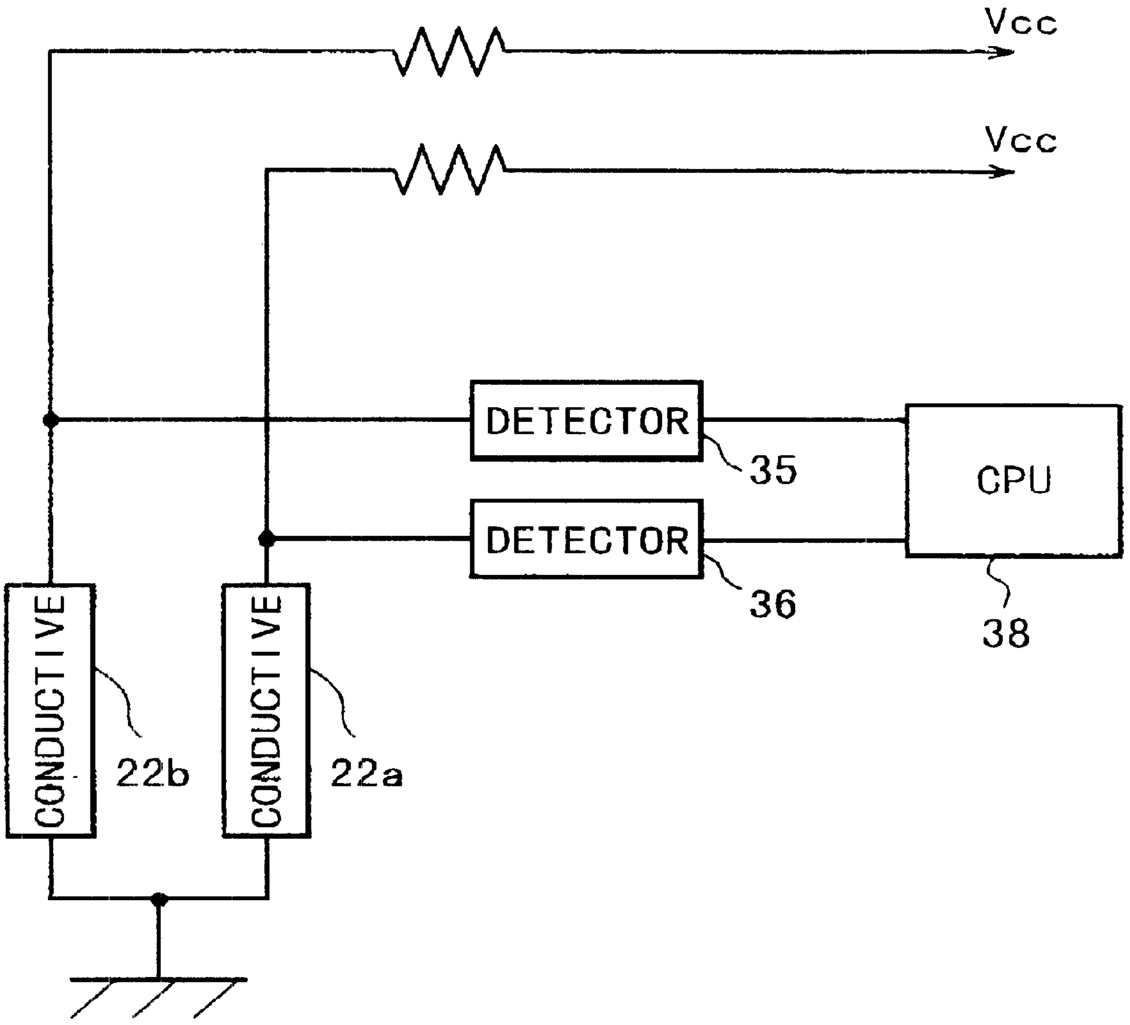
FIG. 19 is a simplified version of the toner seal removal detection circuit in the first embodiment.

To summarize the above-described operations, a flowchart which sums up the above-described operations is given in FIG. 18, and a simplified version of the control circuit for the above-described operations is given in FIG. 19. Referring to FIG. 18, after the mounting (S1) of the process cartridge 15 in this embodiment into the image forming apparatus main assembly 13, it is tested whether electrical current flows through the conductive portion 22*b* (S2). If the flow of electrical current through the conductive portion 22*b* is confirmed, it is tested whether or not electrical current flows through the conductive portion 22*a* (S3). If the flow of electrical current through the conductive portion 22*a* is confirmed, the winding of the toner sealing member 21 is started (S4). As soon as the severance of the conductive portions 22*a* is detected (S5), it is determined that the removal of the toner sealing member 21 has been completed (S6). At this point, the mounting of the process cartridge 15 into the brand-new state is ended (S7). Thereafter, the motor on the image forming apparatus main assembly side is rotated in reverse to start rotating the toner stirring members. On the contrary, if it is confirmed in (S2) that electrical current does not flow through the conductive portion 22*b*, (S9) is taken, in which it is displayed that there is no process cartridge in the apparatus main assembly 13. When it is determined in (S3) that electrical current does not flow through the conductive portion 22*a*, (S8) is taken, in which it is tested whether electrical current flows through the conductive portion 22*b*. If the flow of electrical current through the conductive portion 22*b* is confirmed, (S6) is taken, whereas if the flow of electrical current through the conductive portion 22*b* cannot be confirmed, (S9) is taken.

Referring to FIG. 9, the detecting portions 35 and 36 are provided with a DC current detector and an electrical current which flows through the conductive portions 22*a* and 22*b* while applying electrical voltage to them from a power source. Whether the toner sealing member 21 has been removed, and whether a process cartridge has been mounted in the correct position in the image forming apparatus main assembly, are determined by a CPU 38 based on the measurements provided by the detecting portions 35 and 36.

Embodiment 2

Figure 20:
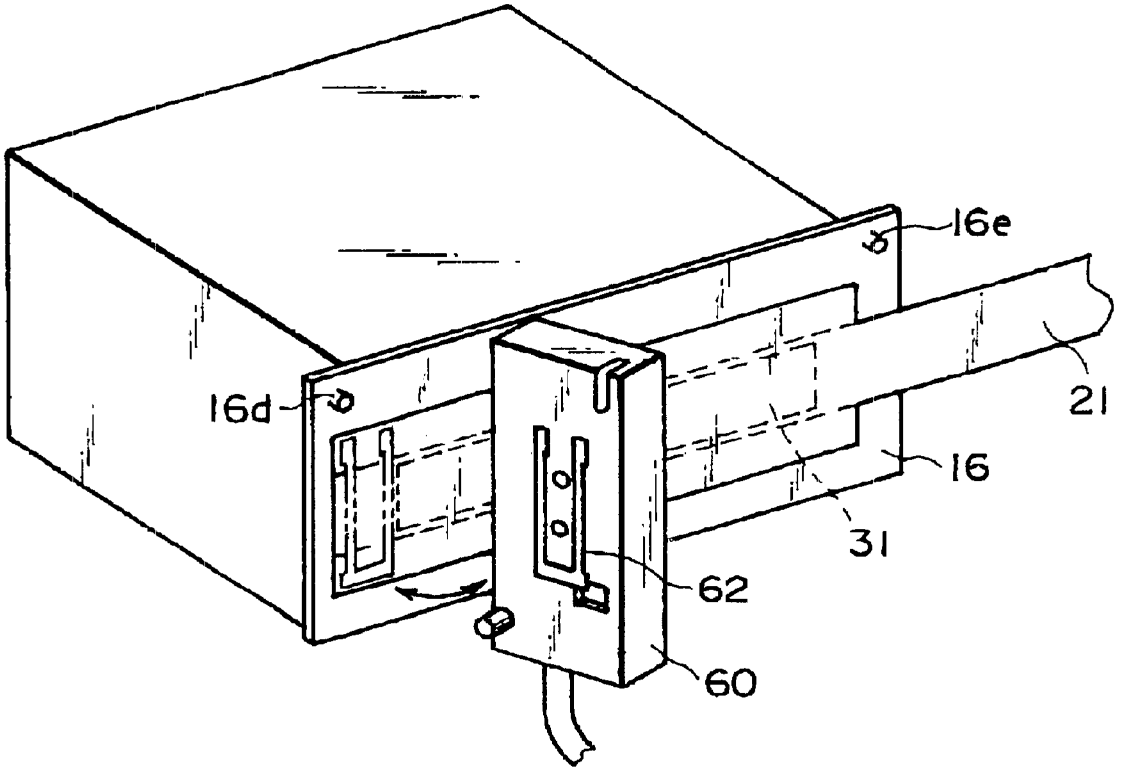
FIG. 20 is a schematic perspective view of the toner container, and the electrically conductive member formed of metallic foil, in the second embodiment of the present invention, during the process for pasting the electrically conductive member to the toner container.

Referring to FIGS. 20 through 25, another method for pasting an adhesive coated conductive member will be described. It is assumed that the opening 31 of the toner holding frame portion 16 has been already sealed with the toner sealing member 21. First, the conductive member 62, the separation paper 61, and a suction based holding jig 60, are prepared. One of the two surfaces of the conductive member 62 has been coated with adhesive, and this adhesive coated surface of the conductive member 62 is entirely covered with the separation paper 61 placed in contact with the adhesive layer. The separation paper 61 is greater in size than the conductive member 62, extending beyond the edge of the conductive member 62, and is square. Referring to FIG. 20, the toner releasing opening 31 of the toner holding frame portion 16 is entirely sealed with the toner sealing member 21 which has been heat-welded to the surrounding edge of the opening 31. Further, the toner holding frame portion 16 is provided with the dowel-like projections 16*d* and 16*e* for positioning the toner holding frame portion 16 relative to the developing means holding frame portion 17.

Figure 21:
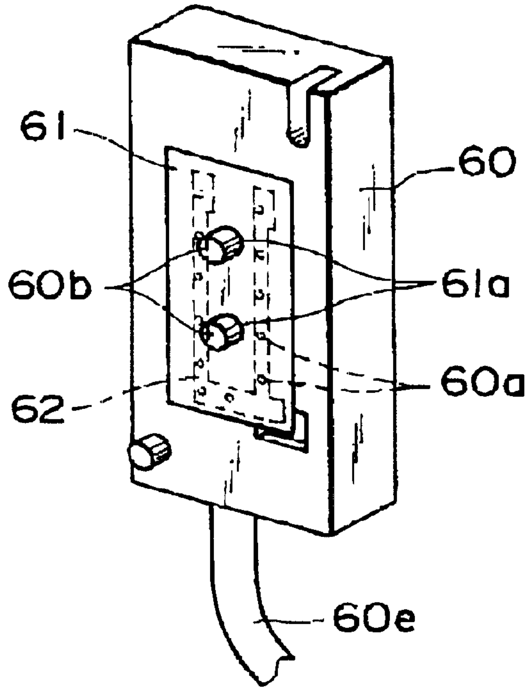
FIG. 21 is a schematic perspective view of the separation sheet backed electrically conductive member formed of metallic foil, which is being held to the suction based holding jig by suction, in the second embodiment of the present invention.
Figure 22:
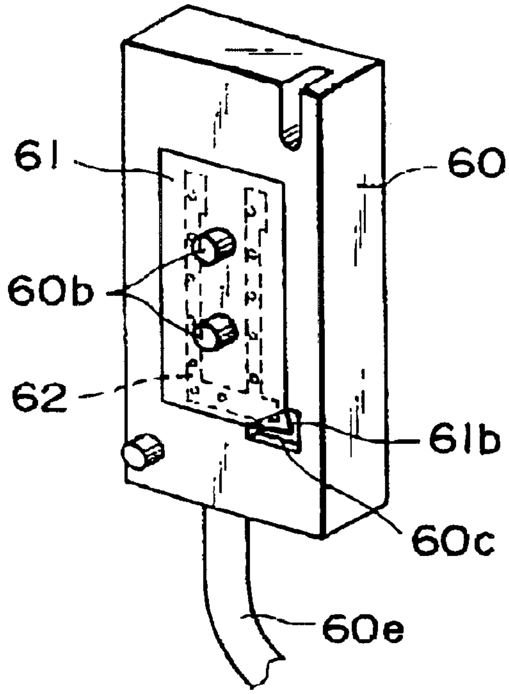
FIG. 22 is a schematic perspective view of the separation sheet backed electrically conductive member formed of metallic foil, a portion of which has been bent inward of the recess of the suction based holding jig, in the second embodiment of the present invention.

A method for forming the conductive member 62 on the toner sealing member 21 will be described. Referring to FIG. 21, the suction based holding jig 60 is provided with a plurality of suction holes 60*a*. Further, the suction based holding jig 60 is provided with a pair of retractable positioning bosses 60*b*, which are located on the surface to which the separation paper 61 is held. The separation paper 61 is provided with a pair of positioning holes 61*a*, the positions of which perfectly match the positions of the retractable positioning bosses 60*b*, one for one. Also, the suction based holding jig 60 is provided with a pair of holes, into or from which the retractable positioning bosses 60*b* can be retracted or projected. In order to paste the conductive member 62 to the toner sealing member 21, first, the bosses 60*b* are put through the positioning holes 61*a* of the separation paper 61 to which the conductive member 62 is adhering. As a result, the separation paper 61 to which the conductive member 62 is adhering is accurately positioned relative to the suction based holding jig 60. Then, the separation paper 62, to which the conductive member 62 formed of metallic foil coated with adhesive is adhering, is secured to the surface of the suction based holding jig 60 by suction, with the conductive member 62 formed of metallic foil placed in contact with the surface of the suction based holding jig 60. Consequently, the combination of the conductive member 62 and separation paper 61 are held to the suction based holding jig 60 in a manner to allow the separation paper 61 to be peeled away from the layer of the adhesive coated on the conductive member 62. The suction holes 60*a* are connected to a hose 60*e* (FIGS. 21 through 24) connected to a suction generating apparatus (unillustrated). Next, the portion 61*b* of the combination of the conductive member 62 formed of metallic foil, and the separation paper 61, where the conductive member 62 and separation paper 61 overlap with each other, is bent into the recess 60*c* (FIG. 22). As a result, the corner portion of the conductive member 62 formed of metallic foil corresponding to the portion 61*b* remains bent inward of the recess 60*c*, whereas the portion of the separation paper 61 corresponding to the portion 61*b* straightens back, separating itself from the portion of the conductive member 62 corresponding to the portion 61*b*, becoming a separation tab, because the separation paper 61 is harder to deform compared to the conductive member 62 formed of metallic foil. In this state, the bosses 60*b* of the suction based holding jig 60 are retracted into the suction based holding jig 60, away from the separation paper 61

Figure 23:
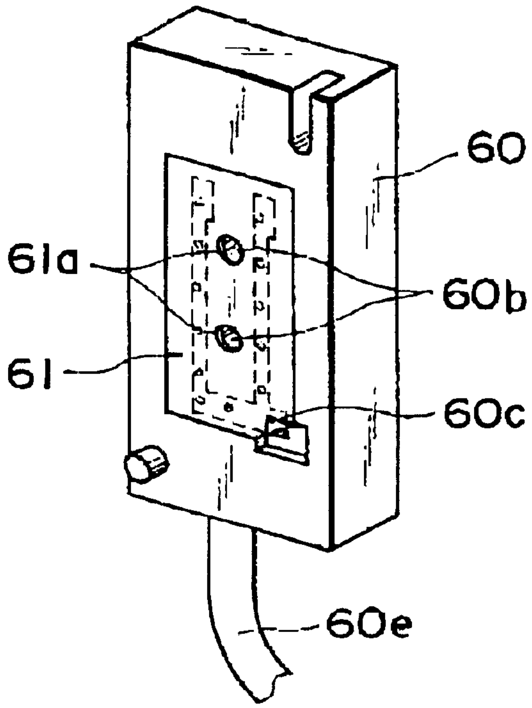
FIG. 23 is a schematic perspective view of the separation sheet backed electrically conductive member formed of metallic foil, a portion of the separation sheet portion of which has been separated from the electrically conductive member, and has become a separation tab for peeling the separation sheet from the electrically conductive member, in the second embodiment of the present invention.
Figure 24:
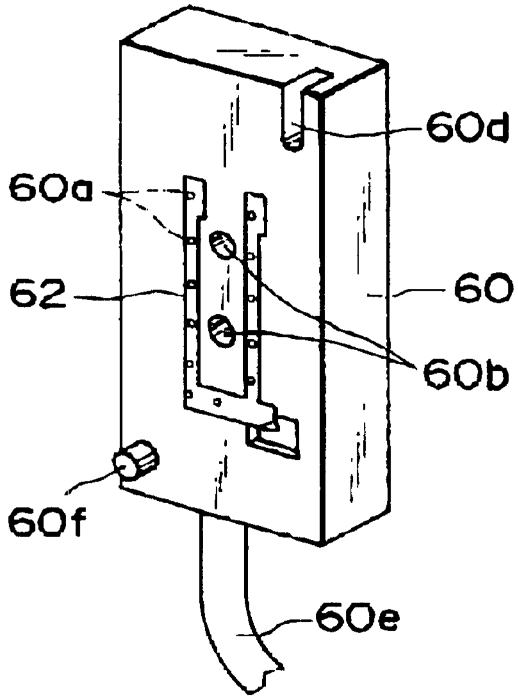
FIG. 24 is a schematic perspective view of the electrically conductive member formed of metallic foil, which is being held to the suction based holding jig by suction, in the second embodiment of the present invention.
Figure 25:
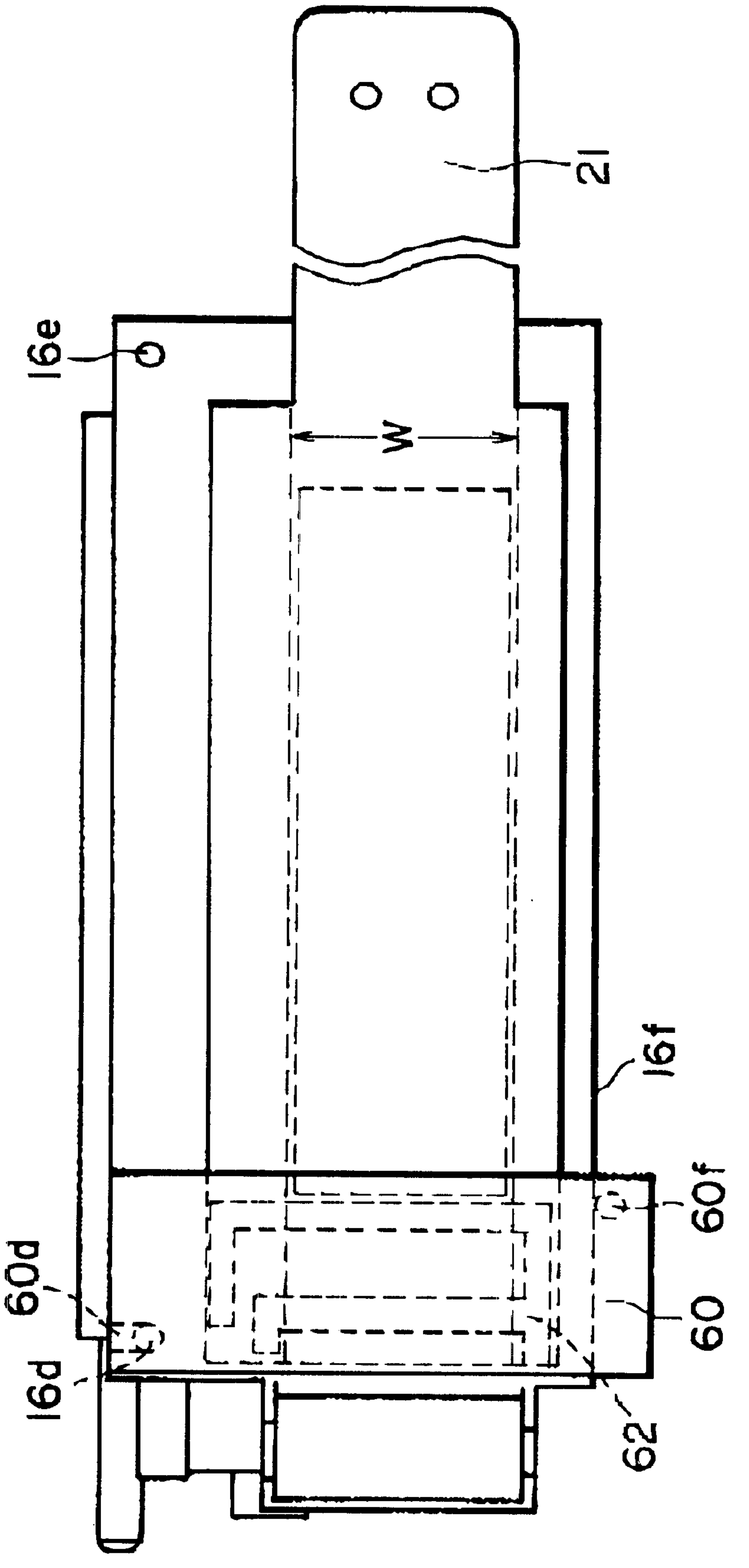
FIG. 25 is a plan view of the toner seal, electrically conductive member formed of metallic foil, and suction based holding jig, during the process in which the electrically conductive member formed of metallic foil is pasted to the toner seal with the use of the suction based holding jig, in the second embodiment of the present invention.

(FIG. 23). With the employment of this method, the separation paper 62 can be safely separated from the adhesive coated surface of the conductive member 62 formed of metallic foil, without deforming the conductive member 62 formed of metallic foil, except for the portion corresponding to the above-described separation tab. Next, the separation paper 61 is separated using the separation tab. In this state, the conductive member 62 is still held to the suction based holding jig 60 by the suction which is acting on the conductive member 62 through the suction holes 60*a* (FIG. 24). Then, in order to paste the conductive member 62 formed of metallic foil, being held to the suction based holding jig 60 by suction, to the toner sealing member 21, the dowel-like positioning projection 16*d* provided on the toner holding frame portion 16 side is inserted into the positioning groove 60*d* of the suction based holding jig 60, and the rotation controlling boss 60*f* of the suction based holding jig 60 is held against the bottom wall of the toner holding frame portion 16. In this state, the suction is stopped (FIG. 25). As a result, the conductive member 62 formed of metallic foil is accurately positioned to be pasted to the toner sealing member 21, across the predetermined area. Thereafter, the conductive member 62 formed of metallic foil is pressed again onto the toner sealing member 21. With the employment of the above-described method, the conductive member 62 can be perfectly pasted to the toner sealing member 21, from one longitudinal edge of the toner sealing member 21, from one longitudinal end of the toner releasing opening 31 to the other, from one longitudinal edge of the toner sealing member 21 to the other, or even from one longitudinal edge of the toner holding frame portion 16 to the other, across the opening 31 in terms of its width direction.

The other features of this embodiment are the same as those of the first embodiment.

According to the above described structural arrangements, it is possible to easily and accurately position a piece of metallic foil, which tends to tear, on a developer sealing member, across a predetermined area, without deforming the piece of metallic foil. As a result, it becomes possible to automatically remove a developer sealing member, without errors, by transmitting driving force from the image forming apparatus main assembly. Further, the above described structural arrangement simplifies the operation for placing a conductive portion formed of metallic foil, reducing, therefore, operational cost.

While the invention has been described with reference to the structures disclosed herein, it is not confined to the details set forth, and this application is intended to cover such modifications or changes as may come within the purposes of the improvements or the scope of the following claims.

What is claimed is:

1. A mounting method for mounting an electroconductive sheet on a developer seal member for sealing a developer discharging opening provided in a developer accommodating container for accommodating a developer, wherein the electroconductive sheet is provided with an adhesive material on one surface thereof, and a separation sheet is adhered to the one surface, the separation sheet being larger than the electroconductive sheet, said method comprising:

a suction step of contacting a suction tool to the other surface of the electroconductive sheet, the suction tool being effective to suck air between the other surface and the suction tool to attract the electroconductive sheet thereon;

an exposure step of separating the separation sheet from the electroconductive sheet while the electroconductive sheet is being sucked by the suction tool, so that the one surface of the electroconductive sheet is exposed; and a bonding step of bonding, after performing said exposure step, the one surface of the electroconductive sheet to the developer seal member while the electroconductive sheet is being sucked by the suction tool.

2. A method according to claim 1, wherein the electroconductive sheet and the separation sheet have predetermined configurations, and before performing said suction step, the separation sheet is bonded at a predetermined position relative to the electroconductive sheet.

3. A method according to claim 1, wherein when the electroconductive sheet is attracted by the suction tool, the electroconductive sheet is positioned relative to the suction tool.

4. A method according to claim 2, wherein the electroconductive sheet is positioned relative to the suction tool by positioning the separation sheet relative to the suction tool.

5. A method according to claim 1, wherein the developer seal member is provided on the developer accommodating container before performing said bonding step.

6. A method according to claim 5, wherein when said bonding step is performed, the suction tool is positioned relative to the developer accommodating container by a positioning means.

7. A method according to claim 6, wherein the positioning means includes a dowel provided in one of the developer accommodating container and the suction tool, and one of a hole, a groove, and a contact portion is provided in the other of the developer accommodating container and the suction tool.

8. A method according to claim 7, wherein the dowel is provided in the developer accommodating container and is used for positioning the developer accommodating container relative to the developer seal member.

9. A method according to claim 1, wherein a suction surface of the suction tool is provided with a recess for facilitating separation of the separation sheet from the suction tool at a position proximate to an end of the separation sheet.

10. A method according to claim 1, wherein the electroconductive sheet is used for detecting that the developer seal member is unsealed.

11. A method according to claim 1, wherein the electroconductive sheet is a metal foil.

12. A method according to claim 1, wherein the separation sheet is a separation paper.

13. A method according to claim 1, wherein the electroconductive sheet has a length larger than a width in which the developer seal member is unsealed, and wherein the length is measured in a direction crossing with a longitudinal direction of the developer seal member.

14. A method according to claim 1, wherein the developer accommodating container is provided in a process cartridge detachably mountable to a main assembly of an image forming apparatus, and wherein the process cartridge is provided with a photosensitive member.

15. A method according to claim 1, wherein the developer accommodating container is provided in a developing cartridge detachably mountable to a main assembly of an image forming apparatus, and wherein the developing cartridge is provided with a developer carrying member for carrying a developer to a development position.

16. A method according to claim 1, wherein a suction operation performed by the suction tool is stopped at a point of time during said bonding step.

* * * * *

UNITED STATES PATENT AND TRADEMARK OFFICE

CERTIFICATE OF CORRECTION

PATENT NO. : 6,585,848 B2 
DATED : July 1, 2003
INVENTOR(S) : Kazuo Chadani et al.

It is certified that error appears in the above-identified patent and that said Letters Patent is hereby corrected as shown below:

Column 5,
Line 32, “point being” should read -- point and beyond, with the portion extending beyond the starting point being --; and
Line 57, “member 21 to” should read -- member 21, at the last portion of the toner sealing member 21 to --.

Column 8,
Line 58, “holding” should read -- holding frame --.

Column 11,
Line 60, “electrical current” should read -- electrical current monitor, and measure the electrical current --.

Column 13,
Line 2, “paper 62” should read -- paper 61 --;
Line 25, “toner sealing member” should be deleted; and
Line 26, “21, from one longitudinal end of the” should be deleted.

Signed and Sealed this

Twenty-fourth Day of February, 2004

JON W. DUDAS
*Acting Director of the United States Patent and Trademark Office*